Nov. 7, 1944.   J. SEEMANN   2,362,030
ARRANGEMENT OF ROTARY SHUTTERS FOR STEREOPHOTOGRAMMETRIC PLOTTING
Filed Feb. 4, 1941   3 Sheets-Sheet 1

Inventor:
Johannes Seemann

Inventor:
Johannes Seemann

Inventor
Johannes Seemann
by Attorney.

Patented Nov. 7, 1944

2,362,030

UNITED STATES PATENT OFFICE 2,362,030

ARRANGEMENT OF ROTARY SHUTTERS FOR STEREOPHOTOGRAMMETRIC PLOTTING

Johannes Seemann, Jena, Germany; vested in the Alien Property Custodian

Application February 4, 1941, Serial No. 377,337
In Germany February 9, 1940

3 Claims. (Cl. 88—16.6)

The invention relates to an arrangement of four rotary shutters for stereophotogrammetric plotting by means of two projectors for alternately throwing stereopictures of a landscape on a screen and an observation device for alternately obscuring the right and the left field of observation and thus enabling an observer looking at said screen to view a plastic model of the landscape, said four shutters being coordinated each to one of the two projectors and to one of the observer's eyes and driven each by a multiple ($n$-phase) current synchronous motor whose rotor is fixed to the appertaining shutter and provided with two pronounced poles which ensure the running of the rotor in right phase relative to the rotating field, each of said shutters having $n$ light transmitting openings.

In accordance with the invention the position of each shutter relative to the appertaining projector or eye, respectively, is so chosen that the plane containing the axis of rotation of said shutter and the axis of the respective projector or eye, respectively, is inclined at an angle of $90°/n$ towards the central axis of that pole of the stator of the appertaining motor which lies nearest to said plane. This arrangement ensures a stereoscopic effect even if the direction of rotation of the shutters coordinated to said projectors or to both eyes is reversed, the effect in question varying from that obtained before the direction of rotation had been reversed (pseudoscopic instead of orthoscopic effect, or vice versa).

The synchronous motors should preferably be of the two-phase hysteresis type whose rotor carries a system of permanent magnets which are so constructed and arranged that the rotor will have two pronounced poles thus ensuring that the rotor will run in right phase relative to the rotating field. Such motors will be of advantage, particularly, if the shutters coordinated to the observer are to be worn on his head, in other words, if the weight of the motors is to be as light as possible and the arrangement a compact one. The most suitable type of shutter for these motors is one having two openings displaced relatively to each other by 180° whose sizes preferably are to be so chosen that the light and dark periods are equal to one another.

Figure 1:
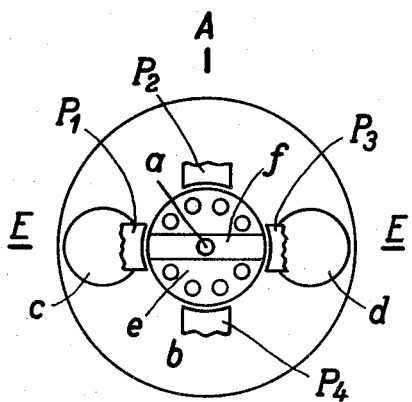
Figure 2:
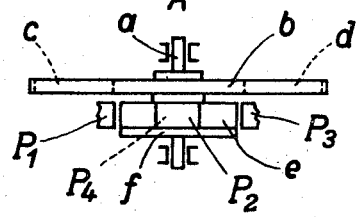
Figure 3:
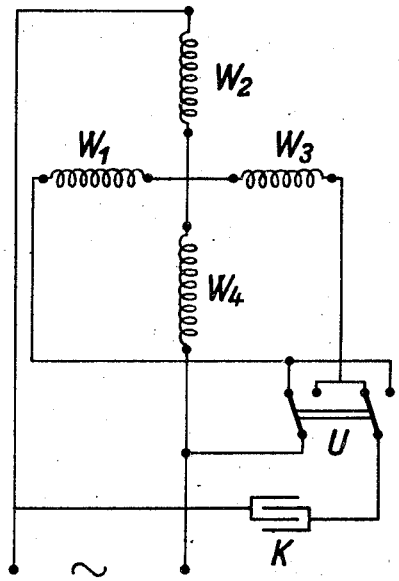
Figures 4A, 4B:
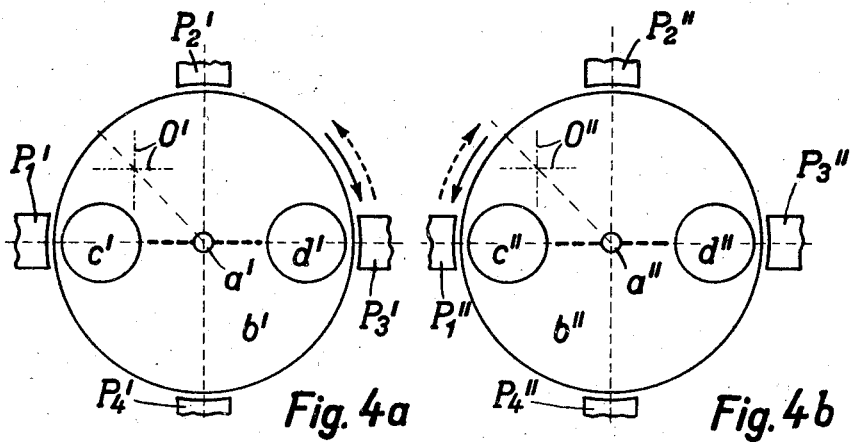
Figures 4C, 4D:
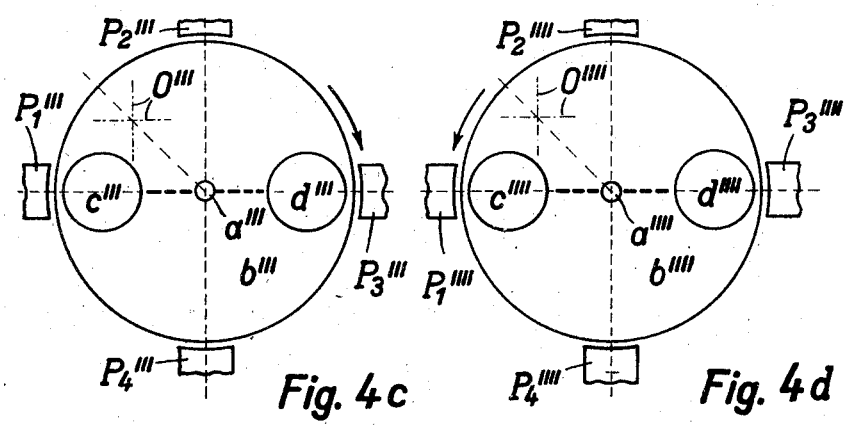
Figures 5, 7:
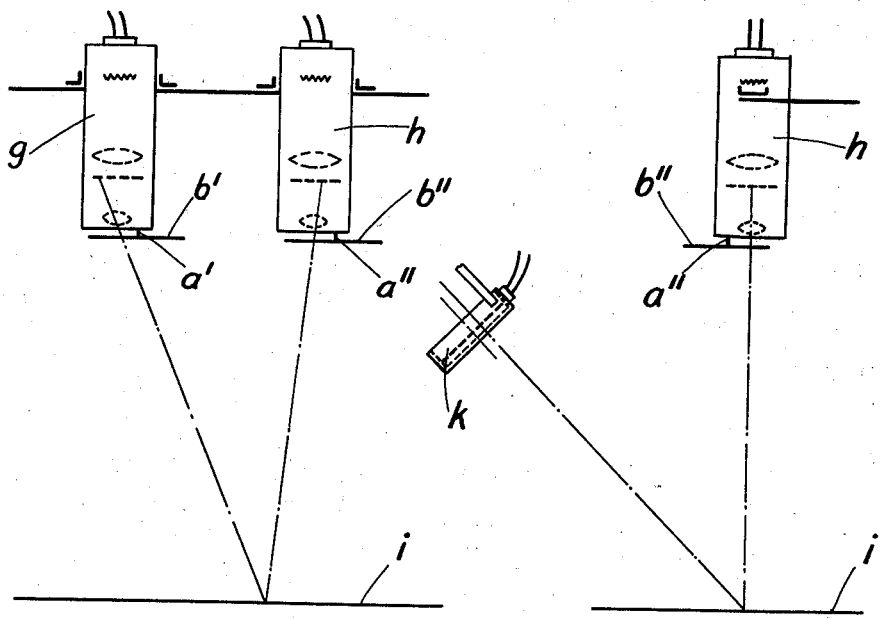
Figure 6:
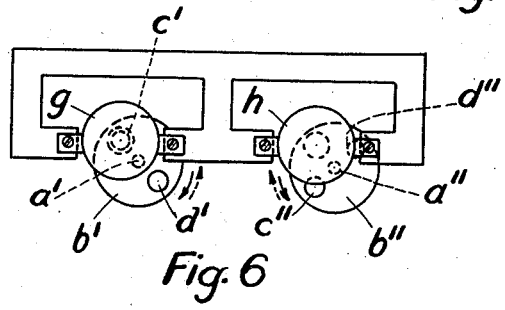
Figure 8:
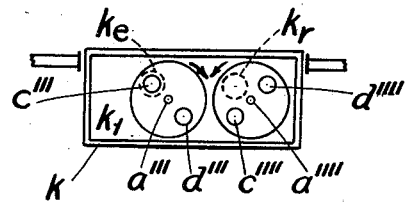

In the annexed drawings a diagrammatic view is given of an arrangement of four rotary shutters according to the invention, of a double projection apparatus, fitted with such shutters, for alternately throwing stereopictures upon a screen, and of a device, fitted with such shutters, for observing the images on said screen. Figs. 1 and 2 represent views of one of said shutters connected with the armature of a two-phase hysteresis motor. Fig. 3 is a wiring diagram of said motor. Figs. 4 $a$ to $d$ illustrate the four shutters of the arrangement in their relative adjustment at one and the same point of time. Figs. 5 and 6 show the double projection apparatus in a front view and a plan view. Fig. 7 illustrates the double projection apparatus and the appertaining observation device in a lateral view. Fig. 8 represents a front view of the observation device.

Fixedly connected to a shaft $a$ is a disc $b$ which contains two circular openings $c$ and $d$ displaced by 180°, whose axes are equidistant from the axis of the shaft $a$ and whose diameters are so chosen that the two tangential planes at each opening, intersecting each other in a line coinciding with the axis of the shaft $a$, are inclined towards each other at an angle of 45°. Furthermore fixedly connected to shaft $a$ is the armature $e$ of a two-phase hysteresis motor. On the front surface of the armature $e$ facing away from disc $b$ a rod magnet $f$ is so attached that its central axis (figuring from pole to pole) coincides with the plane E—E containing the axes of the two openings. The stator of the motor has four fixed poles $P_1$, $P_2$, $P_3$ and $P_4$. The respective windings are $W_1$, $W_2$, $W_3$ and $W_4$. The letter K designates a condenser and the letter U a change-over switch controlling the direction of revolution of the rotating field thus making it possible thereby to change the direction of rotation of the armature $e$. There are four of the rotary shutters of the kind described above. Each of two discs $b'$ (Fig. 4a) and $b''$ (Fig. 4b) is rotatably and in such a manner mounted on one of two projectors $g$ and $h$ (Figs. 5 to 7) for throwing stereopictures of a landscape on a screen $i$ that it lies before the objective of said one projector, the axis of the shaft $a'$ ($a''$) being parallel to the axis of the projector $g$ ($h$) and having from this latter axis the same distance as from the centres of the circular openings $c'$ and $d'$ ($c''$ and $d''$) of the disc $b'$ ($b''$), and the plane containing said two axes bisecting the angle which is formed by the central axes of the poles $P_1'$ and $P_2'$ ($P_1''$ and $P_2''$). In Figs. 4a and 4b the axes of the projectors $g$ and $h$ are illustrated by the intersecting points of coordinate axes O' and O'', respectively. Each of two other discs $b'''$ (Fig. 4c) and $b''''$ (Fig. 4d) is rotatably mounted on a spectacle frame $k$ (Figs. 7 and 8) worn by an observer looking at the screen $i$, the front wall $k_1$ of the frame $k$ being provided with two circular openings $k_e$ and $k_r$ for the left and the right eye of the observer, the axis of the shafts $a'''$ ($a''''$) being perpendicular to the front wall $k_1$ and having from the centre of the circular opening $k_e$ ($k_r$) of the front wall $k_1$ the same distance as from the centres of the circular openings $c'''$ and $d'''$ ($c''''$ and $d''''$) of the disc $b'''$ ($b''''$), and the plane containing the axis of the shaft $a'''$ ($a''''$) and the centre of the circular opening $k_e$ ($k_r$) bisecting the angle which is formed by the central axes of the poles $P_1'''$ $P_2'''$ ($P_1''''$ and $P_2''''$). In Figs. 4c and 4d the centres of the circular openings $k_e$ and $k_r$ for the left and the right eye are illustrated by the intersecting points of coordinate axes $O'''$ and $O''''$, respectively.

With the discs $b'$, $b''$, $b'''$ and $b''''$ rotating synchronously and in accordance with the arrows represented by drawn-out lines, a spatial image true in depth is being presented to the observer. A rotation of this kind makes sure that at every point of time belonging to that respective position of the discs when the latter are displaced by 45° from the position shown in Figs. 4a to 4d and reach the positions shown in Figs. 6 and 8, the light of the left projector $g$ enters the left eye through the circular opening $k_e$, while at every point of time belonging to that respective position of the discs when the latter are displaced by 225° from the position shown in Figs. 4a to 4d, the light of the right projector $h$ enters the right eye through the circular opening $k_r$. If the spatial image to be presented is to be reversed in depth, the sense of rotation of the discs $b'$ and $b''$ coordinated to the projectors $g$ and $h$, respectively, requires to be reversed so that those arrows indicated by broken lines will apply. In this case only the light of the left projector $g$ can enter the right eye through the circular opening $k_r$ and the light of the right projector $h$ the left eye through the circular opening $k_e$.

I claim:

1. An arrangement of rotary shutters for stereophotogrammetric plotting by means of two projectors for alternately throwing stereopictures of a landscape on a screen and an observation device for alternately obscuring the right and the left field of observation and thus enabling an observer looking on said screen to view a plastic model of the landscape, said arrangement containing two pairs of rotary shutters, each of the two shutters of one pair being mounted at one of said two projectors and controlling the light emission of said one projector, each of the two shutters of the other pair being mounted at said observation device and controlling the light entrance to one of the two eyes of the observer, four multiple phase ($n$-phase) current synchronous motors for driving said shutters, the rotor of each of said motors having two pronounced poles and being fixed to one of said shutters, each of said shutters having $n$ light transmitting openings displaced relatively to each other by 360°/$n$, each of said shutters having such a position relative to the appertaining projector or eye, respectively, that the plane containing the axis of rotation of said shutter and the axis of said projector or eye, respectively, is inclined at an angle of 90°/$n$ towards the central axis of that pole of the stator of the appertaining motor which lies nearest to said plane.

2. In a device according to claim 1, the light transmitting openings of each of said shutters being limited by two planes containing the axis of rotation of said shutter and being inclined towards each other at an angle 90°/$n$.

3. An arrangement of rotary shutters for stereophotogrammetric plotting by means of two projectors for alternately throwing stereopictures of a landscape on a screen and an observation device for alternately obscuring the right and the left field of observation and thus enabling an observer looking on said screen to view a plastic model of the landscape, said arrangement containing two pairs of rotary shutters, each of the two shutters of one pair being mounted at one of said two projectors and controlling the light emission of said one projector, each of the two shutters of the other pair being mounted at said observation device and controlling the light entrance to one of the two eyes of the observer, four two-phase current hysteresis motors for driving said shutters, a system of permanent magnets connected to the rotor of each of said motors and adapted to provide said rotor with two pronounced poles, the rotor of each of said motors being fixed to one of said shutters, each of said shutters having two light transmitting openings displaced relatively to each other by 180°, each of said shutters having such a position to the appertaining projector or eye, respectively, that the plane containing the axis of rotation of said shutter and the axis of said projector or eye, respectively, is inclined at an angle of 45° towards the central axis of that pole of the stator of the appertaining motor which lies nearest to said plane.

JOHANNES SEEMANN.